United States Patent

[11] 3,592,447

| [72] | Inventor | Sylvester L. Steffen<br>264 S. Walnut, New Hampton, Iowa 50659 |
|---|---|---|
| [21] | Appl. No. | 857,417 |
| [22] | Filed | Sept. 12, 1969 |
| [45] | Patented | July 13, 1971 |

[54] APPARATUS FOR HANDLING AND CONDITIONING GRAIN
15 Claims, 16 Drawing Figs.

[52] U.S. Cl. ............................................. 259/102, 214/17 CB
[51] Int. Cl. .................................................. B01f 7/24
[50] Field of Search .......................................... 214/17 CB, 17 DB; 259/102, 103, 111; 99/235 S

[56] References Cited
UNITED STATES PATENTS

| 3,114,622 | 12/1963 | Hardy | 259/102 X |
| 3,251,582 | 5/1966 | Murphy | 259/111 |

*Primary Examiner*—Robert G. Sheridan
*Attorney*—Henderson & Strom

ABSTRACT: Apparatus for leveling, stirring, and unloading granular material from a circular bin wherein an upright post is centrally mounted in the bin. A yoke is mounted on the post for vertical and rotational movement and rotatably supports a horizontal support member. Stirring bits which are inclined forwardly and downwardly are mounted on the support member. A horizontally disposed leveling and unloading means is also mounted on the support member. At least a portion of the support member can be rotated to lift the stirring bits from the grain.

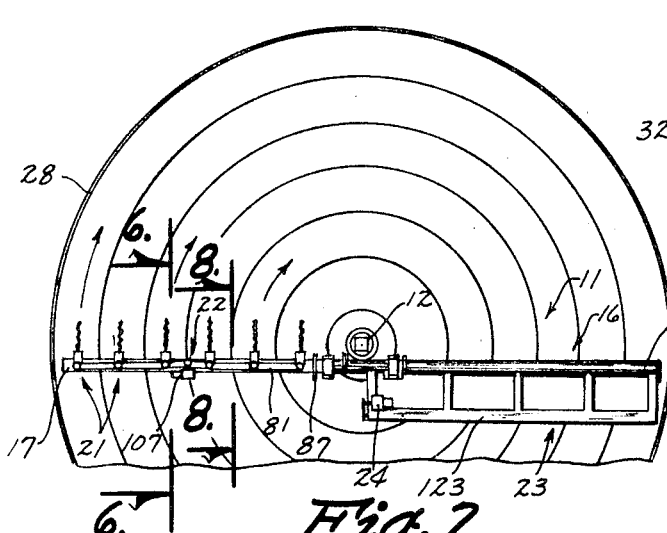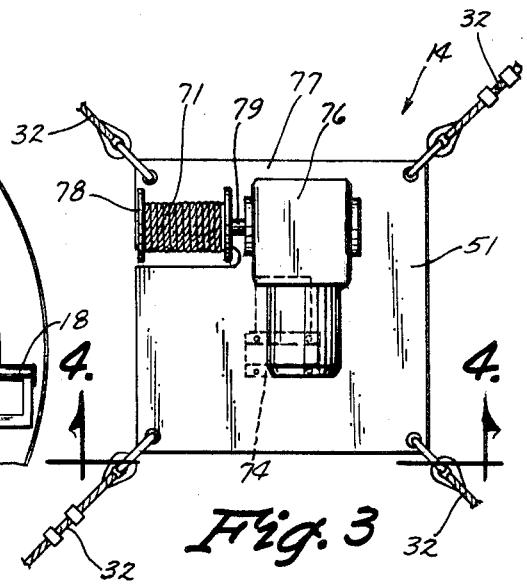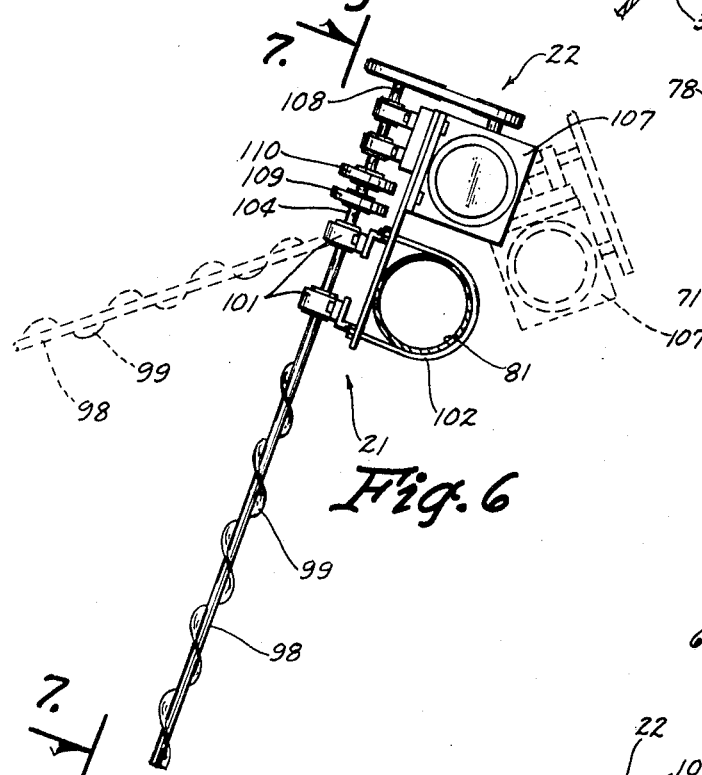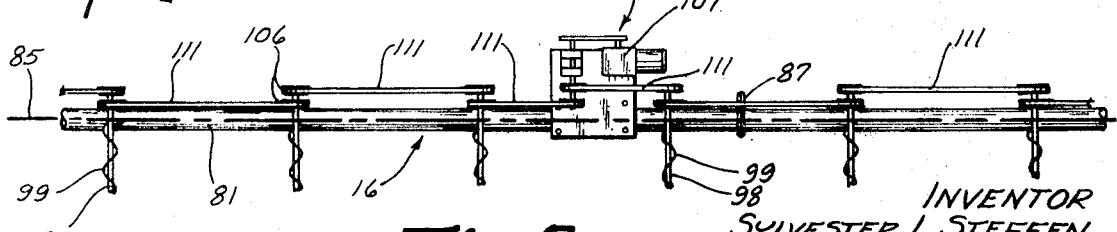

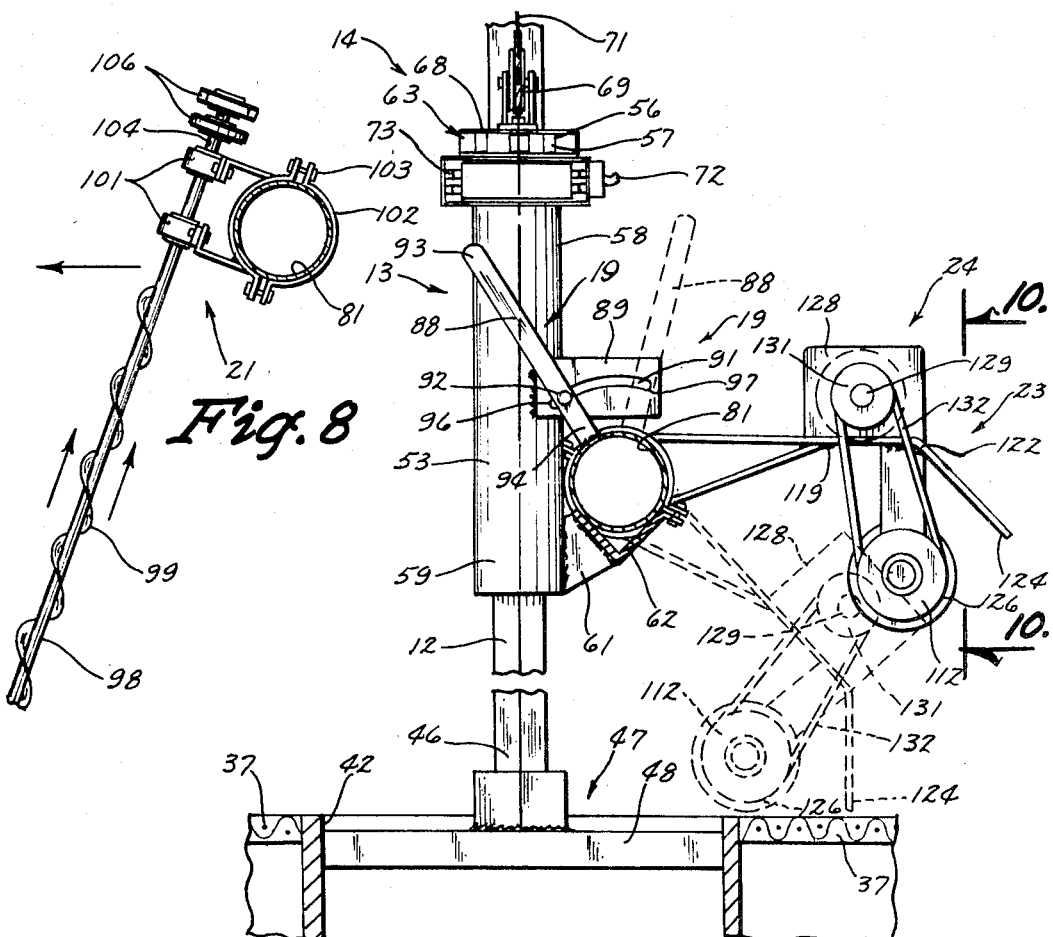
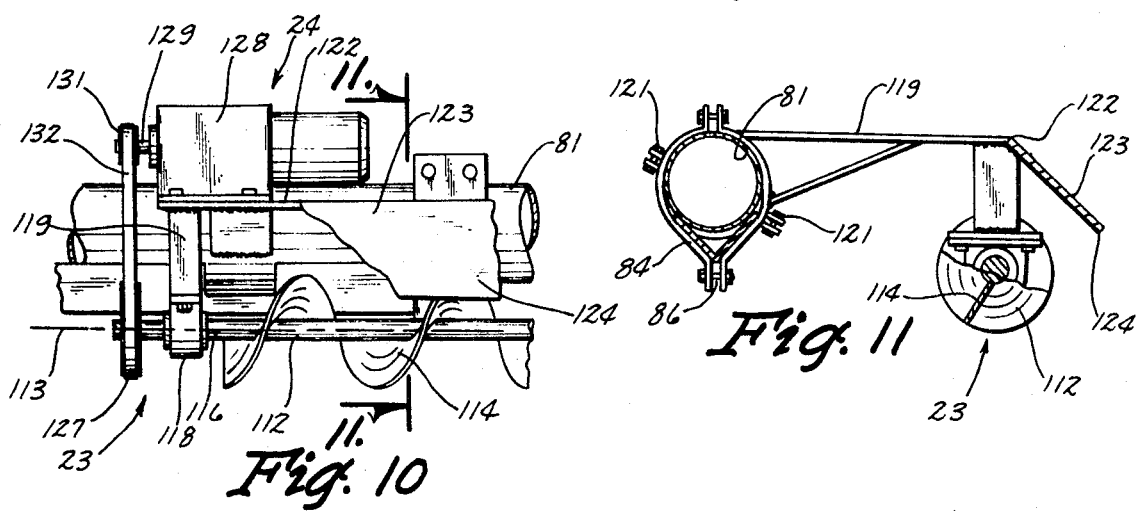

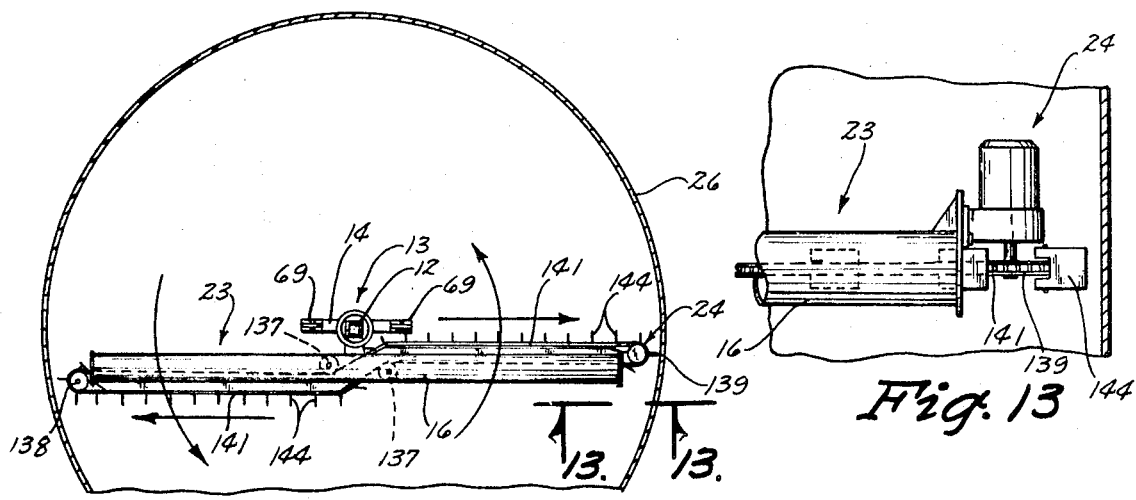
Fig. 12
Fig. 13
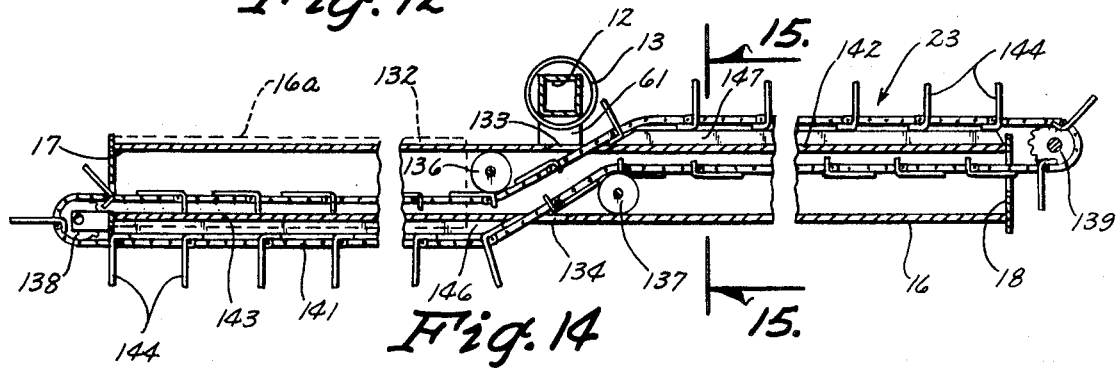
Fig. 14
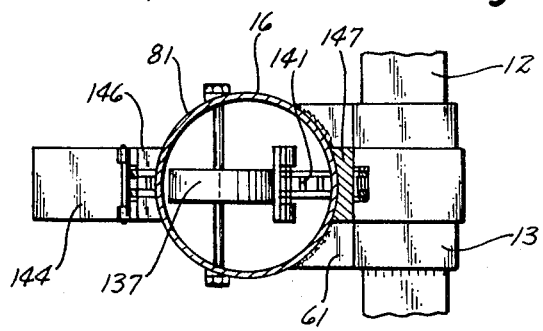
Fig. 15
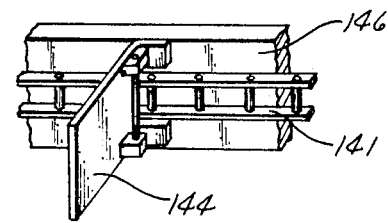
Fig. 16
INVENTOR
SYLVESTER L. STEFFEN
BY Henderson & Strom
ATTORNEYS

APPARATUS FOR HANDLING AND CONDITIONING GRAIN

BACKGROUND OF THE INVENTION

This invention relates to a unique apparatus for leveling, stirring, and unloading granular material from a circular bin. This apparatus achieves these three separate functions by utilizing a horizontally disposed, leveling and unloading means and a plurality of stirring auger means inclined forwardly and downwardly. The leveling and unloading means and the stirring auger means are mounted on a support means rotatable about an upright post mounted centrally in the bin.

After harvest, grain is generally stored on farm prior to eventual transportation to market or on-farm usage. To preserve the grain during the storage period, it has been found to be advantageous to gradually dry the grain. The growth of fungus and bacteria in the grain is thereby minimized and the seed is put to rest in a dormant, stable condition. This process is fully described in Steffen, U.S. Pat. No. 3,408,747.

A number of stirring devices have been introduced to aid in drying grain. These devices stir the grain while warm air is forced upwardly through the grain. Stirring promotes more uniform airflow, prevents air channels from forming in the grain, and facilitates uniformity of drying. Stirring also prevents "hot spots" which occur in unstirred surface grain which is exposed to temperature changes and condensation. Stirring devices manufactured for this purpose are exemplified by the devices described in the following U.S. Pats.: Kalke, U.S. Pat. No. 3,156,541; Sukup, U.S. Pat. No. 3,198,493; and Sukup, U.S. Pat. No. 3,272,480. The commercial structures manufactured under the above patents utilize depending augers extending from proximate the bin roof downwardly to the bin floor. These devices constantly stir all of the grain from bin wall to bin wall and from the bin floor to the top of grain. One auger is utilized which travels from the center of the bin to the bin wall and back again. These devices also utilize a guide track around the upper portion of the bin wall to guide the stirring device.

Apparatus for leveling and unloading granular material utilizing a horizontally disposed auger is illustrated in Steffen, U.S. Pat. No. 3,438,517.

In operation, the above stirring devices significantly reduce drying time in a forced air drying bin. However, certain problems have been recognized. If the long augers are fixed in position, especially forwardly, they tend to break rendering the device inoperable. Grain bins rapidly "go out of round" which, therefore, requires flexible mounting of the devices from the roof of the bin. The stirring auger also pulls the grain to the center of the bin and causes mounding and, concomitantly, uneven airflow through the grain. Constant stirring of grain also tends to crack the kernels and cause the fines or broken kernels to sift downwardly thereby hindering the airflow which, in some cases, may cause fires in the bin. Condensation of moisture on the bin walls also becomes a serious problem in cool weather. Additionally, these devices do not provide means for effectively emptying the bin when the grain is to be used.

The apparatus of this invention for handling and conditioning grain alleviates or minimizes the above described problems. This apparatus can perform three basic and necessary functions: stirring, leveling, and sweep unloading.

SUMMARY OF THE INVENTION

This invention relates to apparatus for leveling, stirring, and unloading granular material from a circular bin wherein the bin has a substantially horizontally disposed auger and tube disposed below the floor of the bin and in communication with both the exterior and the interior of the bin. The apparatus comprises an upright post mounted centrally in the bin; yoke means mounted on the post for vertical movement on the post and rotational movement around the post; and means for raising and lowering the yoke means. A support means is mounted intermediate its ends on the yoke means; the support means being substantially horizontally disposed and at least a portion of the support means being rotatable about the longitudinal axis thereof. Means for rotating the rotatable portion of the support means about its longitudinal axis between a stirring position and an emptying position is operably connected to the support means. A plurality of stirring auger means, rotated by first drive means, are mounted on the rotatable portion of the support means and are inclined downwardly and forwardly relative to the direction of travel of the support means when the stirring auger means are in contact with the granular material. A leveling and unloading means, driven by a second drive means, is mounted on the support means and is substantially horizontally disposed.

An object of this invention is to provide an apparatus for use in a circular grain bin of novel and improved construction which can be utilized to stir and level granular material and can further be utilized in unloading the bin.

A further object is to provide apparatus of the type above described which utilizes relatively short, forwardly extending augers to rotate the yoke means and the support means carried thereby.

Another object is to provide apparatus of the type above described which is mounted on an upright post mounted centrally in the bin.

A still further object is to provide apparatus of the type above described which stirs only the wet grain.

Yet another object is to provide apparatus which minimizes condensation of moisture on the bin walls.

A still further object is to provide a horizontal means for leveling and sweep unloading in conjunction with the stirring apparatus above described.

Another object is to provide apparatus of the type above described wherein at least a portion of the support means can be rotated about its longitudinal axis, thereby raising the stirring auger means from the grain.

BRIEF DESCRIPTION OF THE DRAWINGS

FIG. 2 is a reduced fragmentary top view of the apparatus of FIG. 1.

FIG. 3 is an enlarged sectional view taken along the line 3-3 in FIG. 1.

FIG. 4 is a side view taken along the line 4-4 in FIG. 3.

FIG. 5 is an enlarged sectional view taken along the line 5-5 in FIG. 1, illustrating in phantom, the bearings mounted on the uppermost portion of the yoke means.

FIG. 6 is an enlarged sectional view taken along line 6-6 in FIG. 2, illustrating in phantom, the rotational movement of the support means.

FIG. 7 is a reduced side view taken along the line 7-7 in FIG. 6.

FIG. 8 is an enlarged sectional view of a stirring auger means taken along line 8-8 in FIG. 2.

FIG. 9 is a fragmented, enlarged sectional view taken along line 9-9 in FIG. 1 illustrating, in phantom, the rotational movement of the support means and the bearings mounted on the uppermost portion of the yoke means.

FIG. 10 is a fragmented and enlarged view, with the shield member partially cut away, taken along the line 10-10 of FIG. 9.

FIG. 11 is a sectional view, with the horizontal auger partially cut away, taken along line 11-11 of FIG. 10.

FIG. 12 is a reduced fragmentary top view of a second embodiment of this invention wherein a series of paddles are utilized for leveling and sweep unloading.

FIG. 13 is an enlarged side view taken along the line 13-13 of FIG. 12.

FIG. 14 is an enlarged and foreshortened top view of the embodiment shown in FIG. 12.

FIG. 15 is a magnified sectional view taken along the line 15-15 of FIG. 14.

FIG. 16 is a magnified perspective view of a paddle mounted on the drive chain.

DESCRIPTION OF THE PREFERRED EMBODIMENTS

Figure 1:
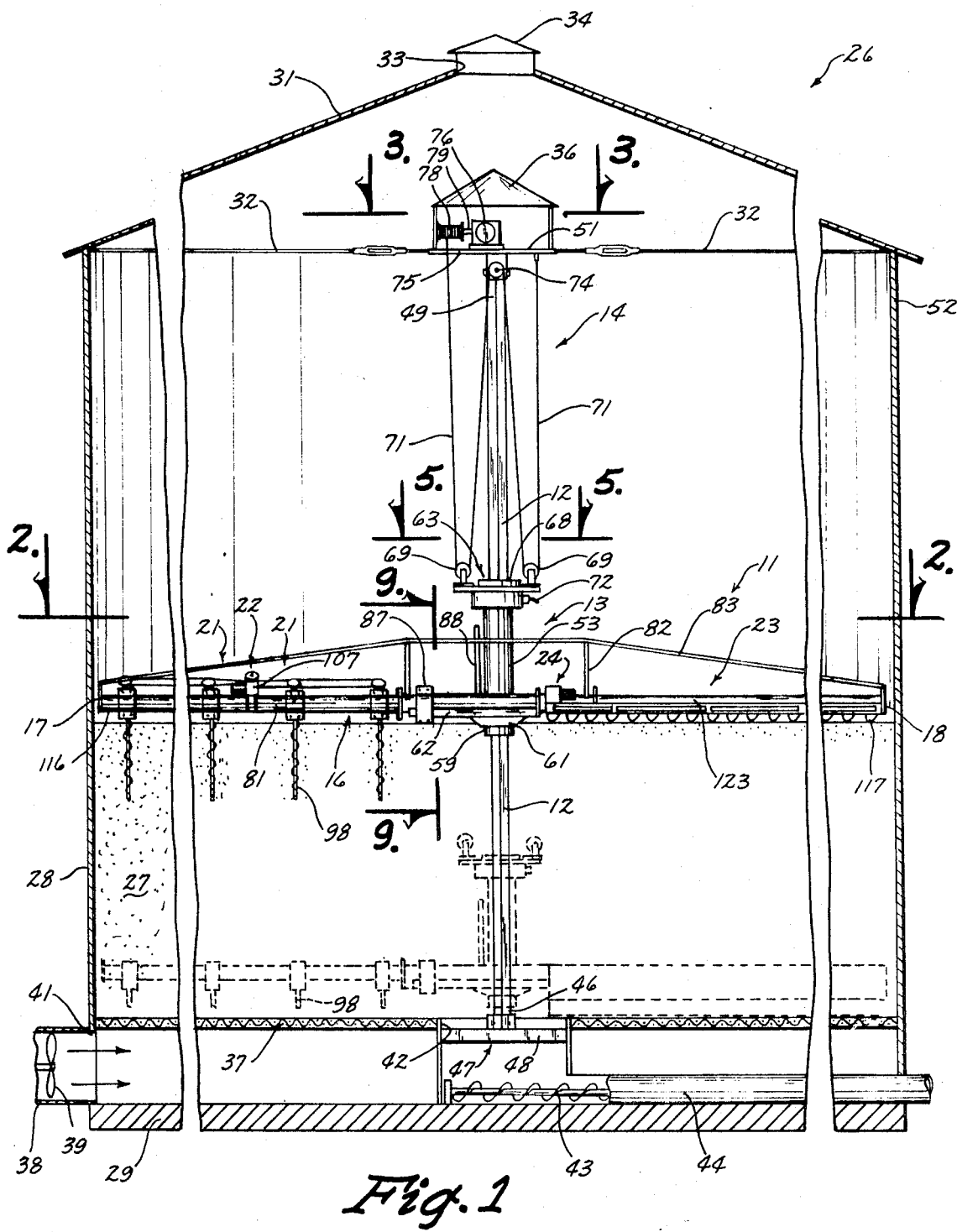
FIG. 1 is a foreshortened, vertical sectional view of a grain bin illustrating one embodiment of the apparatus of this invention for handling and conditioning grain in side elevation in a stirring and leveling position, and, in phantom, in a sweep unloading position.

Referring now to the drawings, the apparatus for leveling, stirring, and unloading granular material is indicated generally at 11 in FIGS. 1 and 2. The apparatus 11 is comprised of an upright post 12, yoke means 13 (FIGS. 1 and 9) mounted on the post 12, and means 14 (FIGS. 1 and 3—5) for raising and lowering the yoke means 13. Support means 16 (FIGS. 1, 2 and 7), or at least a portion 16a of support means 16 (FIG. 14), is rotatably mounted intermediate its ends 17 and 18 and is supported on the yoke means 13. Means 19 (FIG. 9) for rotating the support means 16 about its longitudinal axis is affixed to the support means 16. A plurality of stirring auger means 21 (FIGS. 1, 2, 6 and 8) are mounted on the support means 16 or on the rotatable portion 16a thereof and are rotated by first drive means 22 (FIGS. 6 and 7). A horizontally disposed, leveling and unloading means 23 (FIGS. 1, 2, 9—11 and 12—14) is also mounted on the support means 16 and is driven by the second drive means 24 (FIGS. 9, 10 and 13).

The apparatus 11, as shown in FIG. 1, is mounted in a conventional circular grain bin 26 which is shown partially filled with grain 27. The bin 26 is a conventional structure having a circular sidewall 28 mounted on a concrete base 29 and having a conical shaped roof 31 supported by the sidewalls 28. The upper portions of the sidewall 28 are braced by a plurality of tension members 32 which are connected at the respective ends to the sidewall 28 and the upright post 12. The tension members 32 are arcuately spaced and, generally horizontally disposed. A filler opening 33, having a cover 34 extending thereover to protect the interior of the bin 26 from the elements, is provided at the apex of the roof 31. A second cover 36 of conical shape is disposed below the filler opening 33 and shields the means 14 for raising and lowering the yoke means 13.

A perforated, horizontally disposed floor 37 is mounted between the sidewalls 28 above the concrete base 29 and is supported by conventional substructure (not shown). A heating unit 38 with a fan 39 disposed therein forces air through an aperture 41 in the sidewall 28 between the concrete base 29 and the floor 37. The drying air is forced upwardly through the floor 37 and through the grain 27 and exits through filler opening 33. A material discharge opening 42 is formed in the center of the floor 37 and is equipped with a substantially horizontally disposed auger 43 and tube 44 disposed below the floor 37 and in communication with both the exterior and the interior of the bin 26. Grain 27 is generally unloaded from the bin 26 through this tube 44.

The upright post 12 (FIG. 1) is secured at its lower end 46, centrally in the bin 26, in a framework 47 of horizontally disposed beams 48 disposed in the material discharge opening 42. At its upper end 49, the post 12 is secured, centrally in the bin 26, in a mounting platform 51 which is centrally secured by tension members 32. The post 12 can be of any configuration but is most generally square in cross section as shown in FIG. 5 to prevent the rotation of the means 14 for raising and lowering the yoke means 13. The post 12 extends from the floor 37 upwardly to the height of the uppermost portion of the sidewall 28.

The post 12 can also be hollow and have an auger extending upwardly therein. Then the bin 26 can be filled through the auger 43 and tube 44 hereinbefore described. This feature is illustrated with particularity in my patent, Steffen, U.S. Pat. No. 3,438,517, which is hereby incorporated by reference.

The yoke means 13 (FIGS. 1 and 9) is mounted on the upright post 12 for vertical movement on the post 12 and rotational movement around the post 12. The yoke means 13 comprises a body 53 which is generally of cylindrical configuration. The body 53 has an aperture 54 formed vertically therethrough, the aperture 54 (FIG. 5) having an inside diameter slightly larger than the outside diameter of the upright post 12. The body 53 is slidable vertically on the post 12 and rotatable about the post 12. To decrease friction, bearings (not shown) can be provided around the circumference of the aperture 54.

A plurality of journal boxes 56 (FIGS. 5 and 9) having bearings 57 disposed therein are provided at the upper end 58 of the body 53 to provide means for affixing the body 53 to the means 14 for raising and lowering the yoke means 13. The journal boxes 56 extend outwardly of the body 53 as best shown in FIG. 9.

At the lower end 59 of the body 53 an arm 61 (FIG. 9) is affixed and extends outwardly in the embodiment shown in FIGS. 1—11. The arm 61 supports a carriage member 62 formed from angle iron or the like. The carriage member 62 is horizontally disposed and adapted to secure the support means 16 in a substantially horizontal position. The carriage member 62 is generally elongated (FIG. 1) to furnish maximum support and stability to the support means 16.

The means 14 for vertically raising and lowering the yoke means 13 is shown in FIGS. 1 and 3—5. This means 14 is comprised of several different parts. The yoke support means 63 (FIGS. 5 and 9) is formed in two halves 64 and 65 which engage the bearings 57 of the journal boxes 56. The two halves 64 and 65 define a square hole 66 of the same diameter as the configuration of the post 12. The yoke support means 63 is fastened together by nuts and bolts 67. The yoke support means 63 rotatably supports the body 53 of the yoke means 13 by the bearings 57 of the journal boxes 56. The yoke means 13 can be rotated horizontally while the yoke support means 63 is held stationary by the square configuration of the post 12.

On the upper surface 68 (FIGS. 1 and 5) of the yoke support means 63, at least one winch pulley 69 is mounted. Flexible winch line 71 secures the winch pulleys 69 to the remainder of the means 14 for raising and lowering the yoke means 13.

Also secured in the yoke support means 63 is an electrical inlet wire 72. Through a system of electrical brushes and contacts 73 (FIG. 9), electrical energy is transmitted to the drive means 22 and 24 mounted on the support means 16 while the yoke means 13 is rotating. A similar system is more specifically described in Steffen, U.S. Pat. No. 3,438,517.

Also forming a part of the means 14 for raising and lowering the yoke means 13 is the mounting platform 51 (FIGS. 3 and 4). At least one winch pulley 74 is mounted on the lower surface 75 of the mounting platform 51 and an electric, reversible motor 76 is mounted on the upper surface 77 of the mounting platform 51. A winch 78 is drivably connected to the shaft 79 of the motor 76 and has winch line 71 wrapped therearound and secured to the winch 78. When the motor 76 is activated, the yoke means 13 can be either raised or lowered by a reversible switch (not shown).

As shown herein, the motor 76 is manually activated for purposes of economy. However, in continuous filling of the bin 26, an electrical control system such as described in Steffen, U.S. Pat. No. 3,438,517, Cols. 4 and 5, can be utilized with this apparatus 11.

The support means 16 (FIGS. 1, 2 and 7) is a hollow cylindrical pipe 81 having two ends 17 and 18. The ends 17 and 18 are supported by a truss comprising an upright member 82 secured to the pipe 81 proximate the yoke means 13. A rod 83 or wires extend outwardly and downwardly and are affixed to the ends 17 and 18 of the pipe 81 and provide support therefore. The pipe 81 has a length approximately equal to the diameter of the bin 26 and is mounted on the carriage member 62 intermediate its ends 17 and 18. The pipe 81, in the embodiment shown in FIGS. 1—11, is mounted horizontally and secured on the carriage member 62 by clamps 84 (FIG. 11). The clamps 84 are formed in two pieces and encompass the pipe 81 and the carriage member 62. Prior to rotating the pipe 81 about its longitudinal axis 85 (FIG. 7), the clamps 84 are released by loosening the nut and bolt means 86. The pipe 81 is formed in relatively short lengths having flanges 87 (FIG. 1) on the end portions thereof. The pipe sections can then be bolted together in lengths suitable for any bin size.

The support means 16 is provided with means 19 for rotating the rotatable portion 16a of support means 16 about its longitudinal axis 85 between a stirring position and an unloading position. The means 19 (FIG. 9) for rotating the support means 16, as shown in FIGS. 1—11, comprises a handle 88 rigidly affixed to the pipe 81 near the body 53 of the yoke means 13. The handle 88 is of sufficient length to provide the necessary leverage for rotating the pipe 81 about its longitudinal axis 85. The handle 88 is preferably affixed perpendicularly to the longitudinal axis 85 of the pipe 81. A guide member 89 is affixed to the body 53 of the yoke means 13 and has an arcuate slot 91 formed therein. The slot 91 is formed to guide the guide arm 92 which is affixed to the handle 88. The guide arm 92 is affixed to the handle 88 intermediate the ends 93 and 94 of the handle 88 and is parallel with the pipe 81. The guide arm 92 extends through the slot 91. As shown in FIG. 9, when the guide arm 92 is disposed proximate the left end 96 of the slot 91, the apparatus 11 is in a stirring and leveling position. Conversely, when the guide arm 92 is disposed proximate the right end 97 of the slot 91, the apparatus 11 is in an unloading position. The slot 91, as shown, encompasses about 45° of rotation which has been found to be practical for use herein. The degree of rotation can be varied for different circumstances or applications.

A plurality of stirring auger means 21 are mounted in spaced-apart relation on the support means 16 (FIGS. 1—11) or on the rotatable portion 16a (FIGS. 12—16) of the support means 16. The stirring auger means 21 are inclined downwardly and forwardly relative to the direction of travel when the stirring auger means 21 are in contact with the grain 27.

The stirring auger means 21 are preferably mounted on the support means 16 between the yoke means 13 and one end 17 of the support means 16 on the rotatable portion 16a of the support means 16. By rotating the pipe 81 about its longitudinal axis 85, the stirring auger means 21 can be moved into or out of engagement with the grain 27.

The stirring auger means 21 (FIGS. 8—8) comprise stirring bits 98 having helical flighting 99 disposed therearound and secured in bearings 101. The bearings 101 are aligned and are mounted on a clamp 102. The clamp 102, as shown in FIG. 8, is formed in two separate sections and bolted together with nut and bolt means 103. Therefore, the clamp means 102 can be readily detached from the support means 16 or can be moved to facilitate the stirring operation. On the upper portion 104 of the stirring bits 98 is mounted at least one drivable pulley 106 which is rotatable by the first drive means 22 and, thereby, rotates the stirring bits 98.

The stirring bits 98 are inclined downwardly and forwardly of the pipe 81 relative to the direction of travel of the pipe 81 when the stirring bits 98 are in contact with the grain 27. As shown in FIG. 8, a forwardly inclined angle of about 30° is preferred for use herein. The stirring bits 98, at this angle, can pull the support means 16 forwardly and rotate the support means 16 and the yoke means 13 about the upright post 12. Relatively short stirring bits 98 of less than about 6 feet in length are utilized herein as the grain 27 which requires drying is in the upper strata of the grain bin 26 due to top loading procedures and the upward movement of the warm, moist air. Continued stirring of the dried grain can fracture the grain 27 and will limit its biological value. Therefore, the use of relatively short stirring bits 98 accomplishes the drying function of longer bits but minimizes damage to the grain 27. The correct drying temperatures should be utilized herein to prevent overdrying. See Steffen, U.S. Pat. No. 3,408,747.

In a preferred embodiment of this invention, the diameters of the drivable pulleys 106 are so sized that the speed of rotation of the stirring bits 98 increases systematically from the bits 98 closest to the yoke means 13 to the bits 98 farthest from the yoke means 13. This is accomplished by affixing two drivable pulleys 106 to each stirring bit 98 wherein the diameters of the pulleys 106 affixed to adjacent stirring bits 98 decrease from those nearest the yoke means 13 to those farthest from the yoke means 13. All of the pulleys are driven by first drive means 22, an electric motor 107 having a drive shaft 108 extending therefrom and mounted on pipe 81 between the yoke means 13 and the end 17 of the pipe 81. Two drive pulleys 109 and 110 are mounted on the shaft 108 and are connected to adjacent stirring auger means 21 by V-belts 111. The adjacent stirring auger means 21 are also connected by V-belts 111 thereby transferring power from the motor 107 to the stirring bits 98. This arrangement is preferred herein because the stirring bits 98 spaced outwardly of the yoke means 13 can move the grain 27 upwardly as thoroughly and as quickly as the stirring bits 98 closer to the yoke means 13 even though the linear distance that they travel is considerably greater. Additionally, this arrangement minimizes problems associated with the grain 27 mounding in the middle of the bin 26.

It is also important that the stirring auger means 21 farthest from the yoke means 13 be spaced proximate the sidewall 28. It is preferred that the grain 27 below the stirring bits 98 be left undisturbed after it has dried to facilitate drying of kernels that are in contact with the sidewall 28. The dry air rising along the sidewall 28 and radiant heat from the sun dries the sidewall 28 and prevents moisture from condensing thereon and prevents the concomitant problems associated therewith.

Leveling and unloading means 23 is mounted on the support means 16 between the yoke means 13 and one end 18 of the support means 16. In the preferred embodiment shown in FIGS. 1—11, the leveling and unloading means 23 is an auger 112 which is substantially horizontally disposed, is rotatable about its longitudinal axis 113, and is rotated by a second drive means 24 which, preferably, is reversible. By rotating the support means 16, the leveling and unloading auger 112 can be rotated between a leveling position and an unloading position as best shown in FIG. 9.

The leveling and unloading auger 112 (FIGS. 9—11) has a length approximately equal to the radius of the bin 26. The auger 112 has helical flighting 114 disposed therearound and is supported at its ends 116 and 117 in bearings 118 for rotational movement around the longitudinal axis 113 thereof. The bearings 118 are mounted on the clamp means 119 in horizontally aligned relation and the two piece clamp means 119 is detachably secured to the pipe 81 by nut and bolt means 121.

The clamp means 119 projects forwardly of the support means 16 relative to the direction of travel of the support 16 when the stirring auger means 21 are in contact with the grain 27. The horizontal auger 112 leads the pipe 81 when leveling and supplies a portion of the motive force. The auger 112 pulls grain 27 from the center of the bin 26 and moves it outwardly towards the sidewalls 28 thereby leveling the grain 27. Additionally, the horizontal auger 112 spreads the grain 27 as it is received in the bin 26 and levels the stirring mounds formed behind each of the stirring bits 98.

On the forwardly projecting end 122 of the clamp 119, a shield 123 is mounted. The shield 123 is disposed downwardly at about a 45° angle. The shield 123 extends horizontally the length of the horizontal auger 112 and is spaced outwardly thereof. When the pipe 81 is rotated to the unloading position, the shield 123 is substantially uprightly disposed and acts as a sweep lip. In order to properly perform the sweeping function, the lowermost portion 124 of the shield 123 should be disposed in approximately the same horizontal plane as the lowermost portion 126 of the horizontal auger 112 when in the unloading position (FIG. 9).

When the horizontal auger 112 is utilized for sweep unloading, as described above, the drive means 24 is reversed which also reverses the direction that the horizontal auger 112 is rotated. The horizontal auger 112 will then pull grain 27 from the sidewalls 28 toward the center of the bin 26 and the material discharge opening 42. The horizontal auger 112 will rotate the support means 16 about the upright post 12; however, the direction will be reversed and the shield 123 will act as a sweep lip. The stirring bits 98 will be out of contact with the grain 27 as shown in FIG. 6.

The horizontal auger 112 has a drivable pulley 127 (FIG. 10) affixed at one end 116 thereof which is operably attached to drive means 24. The drive means 24 comprises a motor 128 which has a drive shaft 129 extending therefrom with a drive pulley 131 rigidly mounted thereon. The drive pulley 131 is connected to the drivable pulley 127 by a V-belt 132.

This apparatus 11 can be utilized for leveling grain 27 as it is added to the bin 26; it can be used for stirring and leveling during the drying operation; and it can be used for unloading the bin 26 through the material discharge opening 42. The horizontal auger 112 and the stirring bits 98 furnish the entire rotational motive power for the apparatus 11 thus materially decreasing the cost of the apparatus 11 and the cost of operating the apparatus 11.

In another preferred embodiment, the support means 16 is manufactured in sections. Therefore, the basic apparatus 11 fits all diameters of bins 26. Sections of pipe 81 can readily be secured to the flanges 87 formed on the ends of the pipe 81 and additional sections of horizontal auger 113 can be added thereto.

In the embodiment of this invention shown in FIGS. 12—16, the support means 16 comprises a horizontally disposed, hollow pipe 81 which is rigidly affixed to the arm 61 of the yoke means 13. On one end 17 (FIG. 14), a second pipe 132 is rotatably engaged over pipe 81. The stirring auger means 21 are mounted on this second pipe 132.

The pipe 81 (FIG. 14) has two oppositely disposed longitudinal slots 133 and 134 formed in the pipe 81 proximate the center thereof. Smooth pulleys 136 and 137 are disposed inside the pipe 81 proximate the slots 133 and 134. Toothed pulleys 138 and 139 are disposed at the ends 17 and 18 of the pipe 81. A continuous chain 141 runs along one side 142 of the pipe 81, enters the slot 133 and runs through the center of the pipe 81, then around pulley 138, and along the other side 143 of the pipe 81, enters the slot 134 and runs through the center of the pipe 81 and around pulley 139. A series of L-shaped paddles 144 are attached to the chain 141 and move the grain 27 inwardly or outwardly depending on which way the drive means 24 is rotating. The chain 141 and the paddles 144 are guided on the pipe 81 by guide bars 146 and 147 (FIGS. 14—16) and smooth pulleys 136 and 137.

Although a preferred embodiment has been described hereinbefore, it is to be remembered that various modifications may be made without departing from the invention as defined in the appended claims.

I claim:

1. Apparatus for leveling, stirring, and unloading granular material from a circular bin, the bin having a substantially horizontally disposed auger and tube disposed below the floor of the bin and in communication with both the exterior and the interior of the bin; the apparatus comprising:
   an upright post mounted centrally in the bin;
   yoke means mounted on said post for vertical movement on said post and rotational movement around said post;
   means for raising and lowering said yoke means;
   support means having two oppositely disposed ends mounted intermediate said ends on said yoke means, said support means being substantially horizontally disposed and at least a portion of said support means being rotatable about the longitudinal axis thereof;
   means for rotating the rotatable portion of said support means about its longitudinal axis between a stirring position and an unloading position;
   a plurality of stirring auger means mounted in spaced apart relation on said rotatable portion of said support means between said yoke means and said ends of said support means, said stirring auger means being inclined downwardly and forwardly relative to the direction of rotation of said support means when said stirring auger means are in contact with the granular material;
   first drive means for rotating said stirring auger means;
   leveling and unloading means mounted on said support means between said yoke means and one of said ends of said support means; said leveling and unloading means being substantially horizontally disposed; and
   second drive means for driving said leveling and unloading means.

2. The apparatus of claim 1 wherein said support means is rotatable about its longitudinal axis and wherein all of said stirring auger means are mounted on said support means between said yoke means and the other of said ends of said support means.

3. The apparatus of claim 2 wherein said yoke means comprises:
   a body having an aperture formed vertically therethrough, said aperture having an inside diameter slightly larger than the outside diameter of said post, said body being slidable vertically on said post and rotatable about said post;
   a carriage member rigidly attached to said body and adapted to secure said support means in a substantially horizontal position.

4. The apparatus of claim 3 wherein said support means is a support member having a length approximately equal to the diameter of the bin; said member being securable to said carriage member in a horizontal position and rotatable about its longitudinal axis.

5. The apparatus of claim 4 wherein said stirring auger means comprises:
   clamp means for detachable engagement with said support member;
   bearings mounted on said clamp means in aligned relation and adapted to receive and secure stirring bits;
   stirring bits rotatably secured in said bearings and having helical flighting disposed therearound, said stirring bits being inclined downwardly and forwardly of said support members relative to the direction of travel when said stirring bits are in contact with the granular material, and
   at least one drivable pulley rigidly affixed to the upper portion of said stirring bits and rotatable by said first drive means.

6. The apparatus of claim 5 wherein the diameter of said pulleys are so sized that the speed of rotation of the stirring bits increases systematically from said bits closest to said yoke means to said bits farthest from said yoke means.

7. The apparatus of claim 6 wherein all of said stirring bits are rotated by said first drive means and wherein said first drive means comprises:
   an electric motor having a drive shaft extending therefrom mounted on said support member between said yoke means and said other of said ends of said support member;
   at least one drive pulley rigidly mounted on said drive shaft; and
   mechanical means for transferring power from said drive pulley to said drivable pulleys of said stirring auger means.

8. The apparatus of claim 5 wherein said leveling and unloading means comprises:
   second clamp means for detachable engagement with said support member;
   bearings mounted on said clamp means in horizontally aligned relation and adapted to receive and secure a leveling and unloading auger;
   a leveling and unloading auger rotatably secured in said bearings and having helical flighting disposed therearound, said auger being horizontally disposed.

9. The apparatus of claim 8 wherein said leveling and unloading auger has a length approximately equal to the radius of the bin.

10. The apparatus of claim 9 wherein a shield member is mounted on said second clamp means parallel of said leveling and unloading auger and spaced outwardly of said leveling and unloading auger in relation to said support member; said shield member, when said support member is in an unloading position, being uprightly disposed and having the lowermost portion thereof in approximately the same horizontal plane as the lowermost portion of said leveling and unloading auger.

11. The apparatus of claim 10 wherein said second drive means comprises:
   a second electric motor having a drive shaft extending therefrom and being supported by said support member between said yoke means and said one end of said support member;
   a second drive pulley rigidly mounted on said drive shaft of said second electric motor; and
   belt means connecting said second drive pulley with said leveling and unloading auger.

12. The apparatus of claim 9 wherein said means for rotating said support means comprises:
   a guide member affixed to said body of said yoke means having an arcuate slot formed therethrough;
   a handle rigidly affixed to said support member and disposed perpendicularly thereof;
   a guide arm affixed to said handle intermediate the ends of said handle and parallel of said support member; said guide arm extending through said arcuate slot in said guide member.

13. The apparatus of claim 9 wherein bearings are formed around the uppermost portion of said body of said yoke means and extend horizontally outwardly thereof; and
   wherein said means for raising and lowering said yoke means comprises:
   yoke support means rotatably supporting said body of said yoke means by said bearings;
   at least one which pulley mounted on said yoke support means;
   at least one winch pulley mounted on the uppermost portion of said post;
   a third electric motor mounted on the uppermost portion of said post;
   a winch drivably connected to said third motor; and
   winch line affixed to said winch and operably connected between said winch pulleys for vertically raising and lowering said yoke means.

14. The apparatus of claim 9 wherein said stirring auger means are spaced inwardly of the sidewalls of the circular bin and
   wherein the maximum length of the stirring bits is 6 feet.

15. The apparatus of claim 1 wherein
   said support means comprises a hollow horizontally disposed, first pipe having two oppositely disposed longitudinal slots formed therein proximate the center of said pipe; and a second pipe rotatably engaged over said first pipe from a point proximate one end of the first pipe to about the center of the first pipe; and wherein
   a movable continuous chain passes through one of said slots, through the center of said first pipe to one end thereof, along one outer side of said first pipe and into the other of said slots, through the center of said first pipe to the other end thereof and back along the other outer side of said first pipe to said first slot; and wherein
   paddles are rotatably affixed to said chain.